(12) United States Patent
Yanase

(10) Patent No.: US 6,263,384 B1
(45) Date of Patent: Jul. 17, 2001

(54) FIRST AND SECOND VIRTUAL SERIAL PORTS UTILIZED TO PERFORM VIRTUAL TRANSMISSIONS THROUGH PARALLEL PORT VIA FIRST AND SECOND TRANSMISSION/RECEPTION BUFFER REGION

(75) Inventor: Kenji Yanase, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/181,808

(22) Filed: Oct. 29, 1998

(30) Foreign Application Priority Data

Oct. 29, 1997 (JP) .................................................. 9-314358

(51) Int. Cl.⁷ .............................. G06F 13/00; G06Z 3/00
(52) U.S. Cl. ................................. 710/53; 710/1; 710/52; 709/1; 709/305; 709/320; 375/222
(58) Field of Search .................................. 710/1, 52, 53; 709/1, 305, 320; 375/222

(56) References Cited

U.S. PATENT DOCUMENTS

| | | | |
|---|---|---|---|
| 4,535,427 | * 8/1985 | Jiang | 365/205 |
| 5,515,373 | * 5/1996 | Lynch et al. | 370/465 |
| 5,991,293 | * 11/1999 | Buchanan et al. | 370/353 |
| 6,067,318 | * 5/2000 | Bailey et al. | 375/222 |

* cited by examiner

Primary Examiner—Thomas Lee
Assistant Examiner—Tammara Peyton
(74) Attorney, Agent, or Firm—Oliff & Berridge, PLC

(57) ABSTRACT

A virtual transmission system comprises a first and second virtual serial ports; a first transmission/reception buffer region set with the first virtual serial port as a write port and the second virtual serial port as a read out port; a second transmission/reception buffer region set with the first virtual serial port as a read out port and the second virtual serial port as a write port; and a control portion for writing data outputted from the first virtual serial port into the first transmission/reception buffer region, for outputting data written in the first transmission/reception buffer region to the second virtual serial port, for writing data outputted from the second virtual serial port into the second transmission/reception buffer region, and for outputting data written in the second virtual serial port to the first transmission/reception buffer region.

22 Claims, 7 Drawing Sheets

FIRST AND SECOND VIRTUAL SERIAL PORTS UTILIZED TO PERFORM VIRTUAL TRANSMISSIONS THROUGH PARALLEL PORT VIA FIRST AND SECOND TRANSMISSION/RECEPTION BUFFER REGION

BACKGROUND OF THE INVENTION

1. Field of the Invention

The present invention relates to a virtual transmission system enabling changing the use of an application software, such as for personal computer transmission, personal fax transmission, and other types of transmission, in a user mode, without actually changing the application software itself. The user mode is a non-exclusive mode wherein access to system data and interfaces that can be used are limited.

2. Description of the Related Art

Recently, a variety of different types of application software are available for enabling personal computers to transmit data to and receive data from peripheral or remote devices. For example, application software is available for enabling personal computers to perform data transmission and reception with a peripheral printer over a cable or with a remote facsimile machine over a telephone line. Transmission application software is generally configured to perform reception and transmission of data over a serial port connected to a modem.

There is a demand to change the use of transmission application software. For example, it would be desirable if transmission application software for performing transmission and reception of data through a serial port could be used to perform transmission and reception of data through a parallel port, instead of a serial port. Also, it would be desirable if transmission application software could be used to check, using the personal computer, transmitted and received data.

However, in order to fill change use of the transmission application software, the transmission application software itself must be rewritten or the kernel mode program must be greatly changed. It is difficult to rewrite transmission application software. Further, the kernel mode program is an exclusive processor mode, which is capable of accessing the system data and hardware, and so is also very difficult to rewrite.

SUMMARY OF THE INVENTION

It is an objective of the present invention to realize, within a single computer, a virtual transmission system that uses a serial port as a transmission port and to realize the virtual transmission system by only slightly modifying changeable portions of the kernel mode and without changing the application program itself. It is a further objective of the present invention that the virtual transmission system be capable of checking operation of application software designed to use a serial port as its transmission port, of processing data received by and transmitted from the application software, and of reception by and transmission from the application software of data over a parallel port.

A virtual transmission system according to the present invention comprises a first and second virtual serial ports; a first transmission/reception buffer region set with the first virtual serial port as a write port and the second virtual serial port as a read out port; a second transmission/reception buffer region set with the first virtual serial port as a read out port and the second virtual serial port as a write port; and a control portion for writing data outputted from the first virtual serial port into the first transmission/reception buffer region, for outputting data written in the first transmission/reception buffer region to the second virtual serial port, for writing data outputted from the second virtual serial port into the second transmission/reception buffer region, and for outputting data written in the second virtual serial port to the first transmission/reception buffer region.

The first and second virtual serial ports can be added and memory for the first and second transmission/reception buffer regions can be secured by, for example, rewriting content of a serial driver in the kernel mode. For example, the serial.sys program in the device driver of "Windows NT™" which is a product available from Microsoft Corporation, serves as the serial driver, so that in a computer using "Windows NT™", the serial.sys program in the device driver should be rewritten to add the first and second virtual serial ports and to secure memory for the first and second transmission/reception buffers regions.

According to this aspect of the present invention, the virtual transmission system further includes a memory storing: a transmission application software for performing transmission and reception using a serial port and set with one of the first and second virtual serial ports as the serial port, and another transmission application software for performing transmission and reception of data with the transmission application software and set to output data to and input data from another of the first and second virtual serial ports.

With this configuration, operations of a transmission application software that is still being developed can be checked in a single computer. In this case, the transmission application software is installed in the computer and the first virtual serial port is set as its transmission port. As a result, the transmission application software will transmit data to and receive data from the first virtual serial port. Also, a check application software for checking operation of the transmission application software is installed in the computer and set with the second virtual serial port as its transmission port. As a result, the check application software will transmit data to and receive data from the second virtual serial port.

Data generated by operation of the transmission application software will be written in the first transmission/reception buffer region. The check application software will retrieve the data from the first transmission/reception buffer region through the second virtual serial port and output response signals, such as commands and data, to the second virtual serial port in response to the retrieved data. It should be noted that when an application software is described in the specification as retrieving or outputting data, this means that operation of the CPU based on the application software causes data to be retrieved or outputted. Similarly, when data is described in the specification as being passed to or outputted to an application software, this means that data is made available for processing according to the application software. The response signals are then written in the second transmission/reception buffer region and sent to the transmission application software through the first virtual serial port, whereupon the transmission application software receives the response signals. Accordingly, the operation of the transmission application software can be easily checked using a single computer by performing virtual transmission and reception between the transmission application software and the check application software and determining whether all data was correctly transmitted and received from start to finish of a transmission series.

According to another aspect of the present invention, an actual port is provided for connecting with an external device, wherein the another transmission application software is for processing data from the transmission application software and, based on the processed data, performing transmission and reception with the external device through the actual port.

With this configuration, a commercially available transmission application designed for performing transmission over a serial port can be used to perform transmission with an external device connected to a parallel port. An example will be provided for the case when a multifunction device is connected to the parallel port. A multifunction device includes a facsimile modem, an image retrieval unit, and a printing unit, and can function as a scanner, a facsimile machine, a copy machine, and a printer. When a multifunction device is connected to the parallel port, a data processing application software is provided to process data going to and coming from the commercially available transmission application as needed to enable transmission with the multifunction device. For example, facsimile data outputted from the commercially available transmission application software passes through the first virtual serial port, is stored in the first transmission/reception buffer region, is sent through the second virtual serial port, and retrieved by the data processing application software. To indicate to the multifunction that data from the transmission application software is facsimile data, the data processing application software adds header information indicating this to the data received from the second virtual serial port BRCOM2.

Also, the data processing application software changes format, such as by removing header information, of data received from a remote device over the multifunction device and the parallel port to which the multifunction device is connected. The data processing application software then outputs the processed data to the second virtual serial port. As a result, the process data is stored in the second transmission/reception buffer region and sent to the first virtual serial port, whereupon it is received by the commercially available transmission application.

A memory medium according to the present invention stores a program for adding a first and second virtual serial ports to a single computer; a program for adding, to the single computer, a first transmission/reception buffer region that receives data from the first virtual serial port and passes the data to the second virtual serial port; and a program for adding, to the single computer, a second transmission/reception buffer region that receives data from the second virtual serial port and passes the data to the first virtual serial port.

For example, the virtual transmission system can be realized in a computer that uses "Windows NT™" as its operating system by setting a memory medium according to the present invention in the computer. In this case, a memory medium, such as a CD-ROM, according to the present invention stores a program for rewriting the serial.sys of the modifiable device driver in the kernel mode of the operating system. Once installed in the computer, the program rewrites the serial.sys in order to add a first and second virtual serial ports in addition to existing serial ports (including existing extension ports) that were originally provided to the computer. The program also rewrites the serial.sys in order to enable the first and second virtual serial ports to perform mutual transmission of data via the first and second transmission/reception buffer regions.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

A virtual transmission system according to a preferred embodiment of the present invention will be described while referring to the accompanying drawings.

Figure 1:
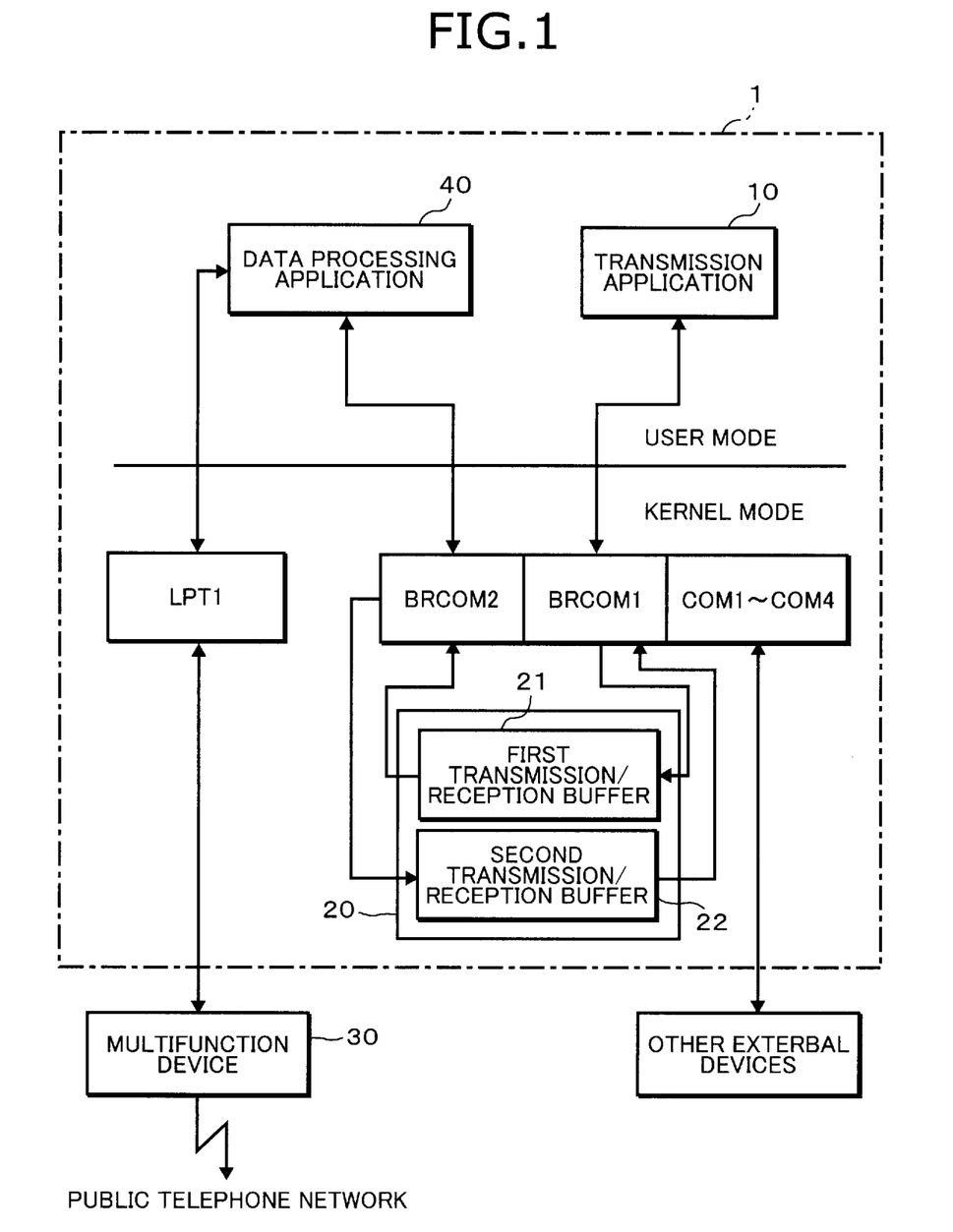
FIG. 1 is a schematic view showing a personal computer including a virtual transmission system according to an embodiment of the present invention.

The present invention describes a virtual transmission system for enabling a commercially available transmission application software, which is designed to perform transmission over a serial port, to perform transmission over a parallel port to an external device via a multi-function device connected to the parallel port. Configuration of the system is schematically shown in FIG. 1.

The personal computer 1 includes a user mode and a kernel mode. The user mode is a non-exclusive mode with limitations on access to system data and on what interfaces that it can use. The kernel mode is an exclusive processor mode capable of accessing system data and hardware. Normally, personal computers are loaded with an operating system such as "Windows NT™" or "Windows NT™," which are both products available from Microsoft Corporation. The operating system code works in the kernel mode. On the other hand, application software is provided separate from the operating system and operates in the user mode. The personal computer 1 of the present embodiment uses "Windows NT™" as its operating system.

A commercially available transmission application software 10 and a data processing application 40 are installed in the user mode. An example of the transmission application software 10 of the present embodiment is software designed for performing facsimile transmission and reception using a modem connected to a serial port of the personal computer 1. A parallel port LPT1 connected to an external multifunction device 30, which serves as an external device, is provided in the kernel mode. Further, the personal computer 1 is originally provided with serial ports COM1 to COM4 (which include extension ports). The serial ports COM1 to COM4 are also provided in the kernel mode. Although not shown in the drawings, a ROM storing various application programs, and a central processing unit (CPU) is provided for controlling overall operation of the computer 1 based on the programs stored in the ROM. The CPU, the RAM 20, and the ROM are connected to each other by a bus line to enable mutual transmission of data.

Although not shown in the drawings, a device driver is also installed in the kernel mode of the "Windows NT™" operating system. The source of the device driver is well-known and so is rewritable. The device driver includes a serial.sys program that has been rewritten to add a first and second virtual serial ports BRCOM1, BRCOM2 and to set the first virtual serial port BRCOM1 as a transmission port for the transmission application software 10. As a result, transmission data generated by operation of the transmission application software 10 is outputted through the first virtual serial port BRCOM1 and data inputted through first virtual serial port BRCOM1 is transmitted to the transmission application software 10.

The personal computer 1 includes a RAM 20 with first and second transmission reception buffer regions 21, 22. The first transmission reception buffer region 21 is defined to write data from the first virtual serial port BRCOM1, retrieve the stored data, and output it to the second virtual serial port BRCOM2. The second transmission reception buffer region 22 is defined to write data from the second virtual serial port BRCOM2, retrieve the stored data, and output it to the first virtual serial port BRCOM1. In a manner to be described later, the first and second transmission reception buffer regions 21, 22 can be secured in the RAM 20 by rewriting the serial.sys program in the device driver.

When the transmission application software 10 is directed to output data to, for example, the serial port COM1, data is transmitted through the serial port COM1 directly to an external device connected to the serial port COM1. When no external device is connected to the serial port COM1, or when the external device is unable to receive data, the serial port COM1 refuses to receive the data.

As described above, according to the present invention, the transmission application software 10 is directed to output data to the first virtual serial port BRCOM1. Although no external device is connected to the first virtual serial port BRCOM1, the first virtual serial port BRCOM1 receives data generated by operation of the transmission application software 10 and passes it to the first transmission reception buffer region 21, where it is stored. In other words, the first transmission reception buffer region 91 serves as an external device connected to the first virtual serial port BRCOM1 so that the transmission application software 10 operates as though an external device is connected to the first virtual serial port BRCOM1.

The multi-function device 10 includes a fax modem, an image retrieval unit, and a printing unit, and so is capable of functioning as a scanner, a facsimile machine, a copy machine, and a printer. The fax modem is capable of performing transmission and reception with a remote device over a public telephone line network, which serves as a transmission circuit.

The multi-function device 30 is designed to transmit and receive data using package transmission. During package transmission, header information is appended to the transmission data. The header information is formed from packet number (ID data) and data size (length data). The packet number indicates which function the transmission data relates to and the data size indicates length of the transmission data.

As mentioned above, the transmission application software 10 is only capable of serial transmission and reception. The data processing application software 40 is installed to enable transmission and reception between the transmission application 10 and the multi-function device 30 using packet transmission. The data processing application software 40 is set with both the second virtual serial port BRCOM2 and the parallel port LPT1 as its transmission ports. Therefore, the data processing application software 40 retrieves, through the second virtual serial port BRCOM2, any data written in the first transmission reception buffer region 21. The data processing application software 40 is designed to process the data, such as by appending header information necessary for package transmission as described above, so the data can be output to the parallel port LPT1. As mentioned above, the appended header information includes packet number and data size, the packet number being for indicating a function of the multi-function device 30.

The data processing application software 40 also has a function for processing fax data received from the multi-function device 30 over the parallel port LPT1 into fax data in the same form as though it were received from a modem connected to a serial port, and then outputting the processed fax data to the second virtual serial port BRCOM2. Data outputted to the second virtual serial port BRCOM2 is transmitted to the second virtual serial port BRCOM1 via the second transmission/reception buffer region 22.

With this configuration, the data processing application software 40 processes fax data received by the multi-function device 30 into a data format that the commercially available transmission application software 10 can process. Afterward, the data processing application software 40 writes, in accordance with necessity, the processed data into the second transmission reception buffer region 22 through the second virtual serial port BRCOM2. The transmission application software 10 then retrieves, through the first virtual serial port BRCOM1, the thus-processed data from the second transmission reception buffer region 22. In other words, the transmission application software 10 can handle data from a fax modem connected to the parallel port as though it were data from a fax modem connected to a serial port. It should be noted that whether data is transmitted from the port BRCOM1 to the buffer region 21 to the port BRCOM2 or from the port BRCOM2 to the buffer region 22 to the port BRCOM1, the access location is indicated to the relevant application softwares in the form of a port name (i.e., BRCOM1 or BRCOM2).

Figure 3:
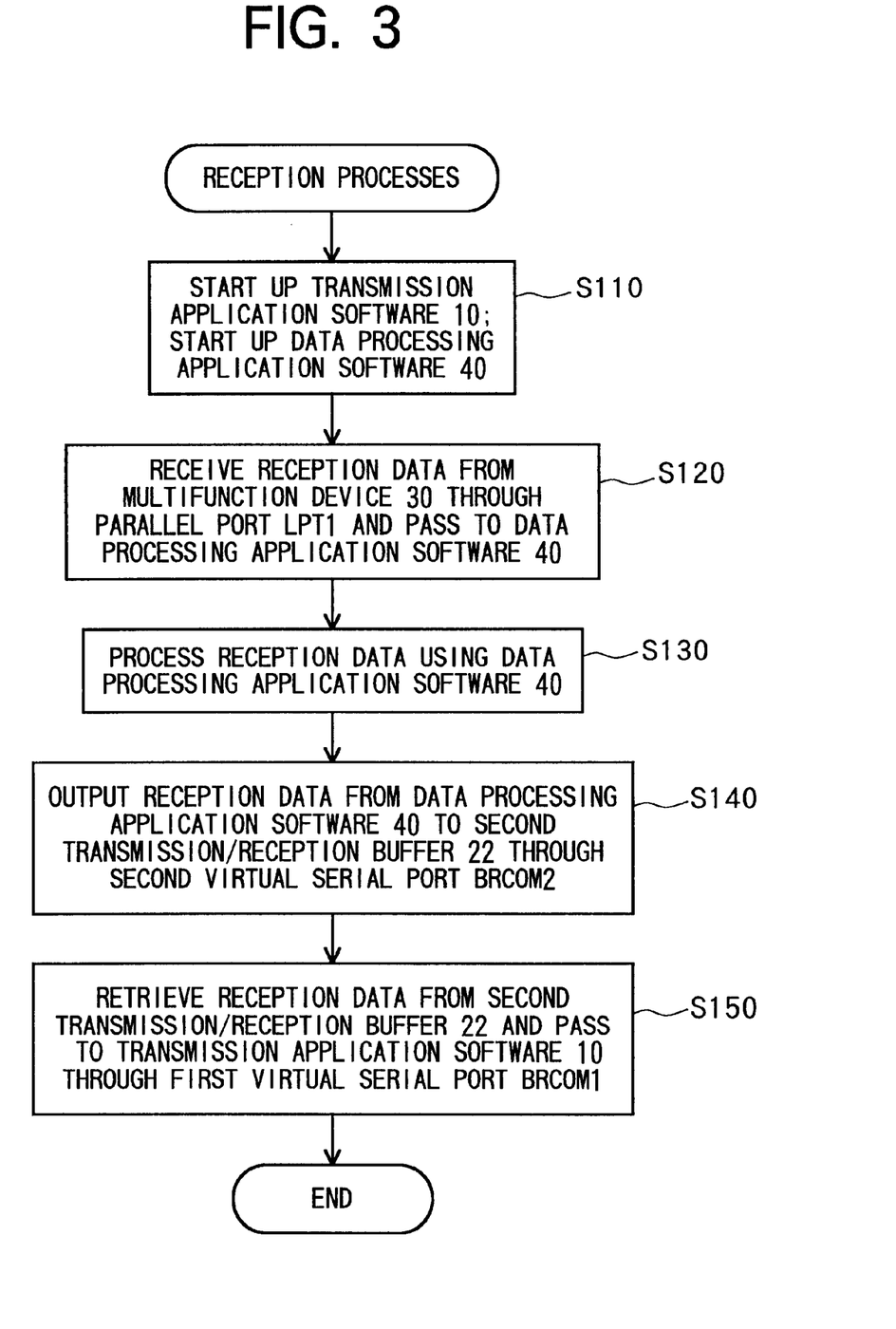
FIG. 3 is a flowchart representing reception processes performed in the personal computer using the virtual transmission system.

Here, an explanation of general operation of the virtual transmission system according to the present invention will be provided. First, reception processes performed by the CPU will be described while referring to FIG. 3. When reception processes are started, in S110, the transmission application software 10 and the data processing application software 40 are started up. Then, in S120, reception data is received from the multifunction device 30 through the parallel port LPT1 and passed to the data processing application software 40. Next in S130, the data processing application software 40 processes the reception data by, for example, removing header information. Afterward, in S140, the data processing application software 40 outputs the reception data to the second transmission/reception buffer region 22 through the second virtual serial port BRCOM2. Finally, in S150, the reception data is retrieved from the second transmission/reception buffer region 22 and passed to the transmission application software 10 through the first virtual serial port BRCOM1.

Figure 4:
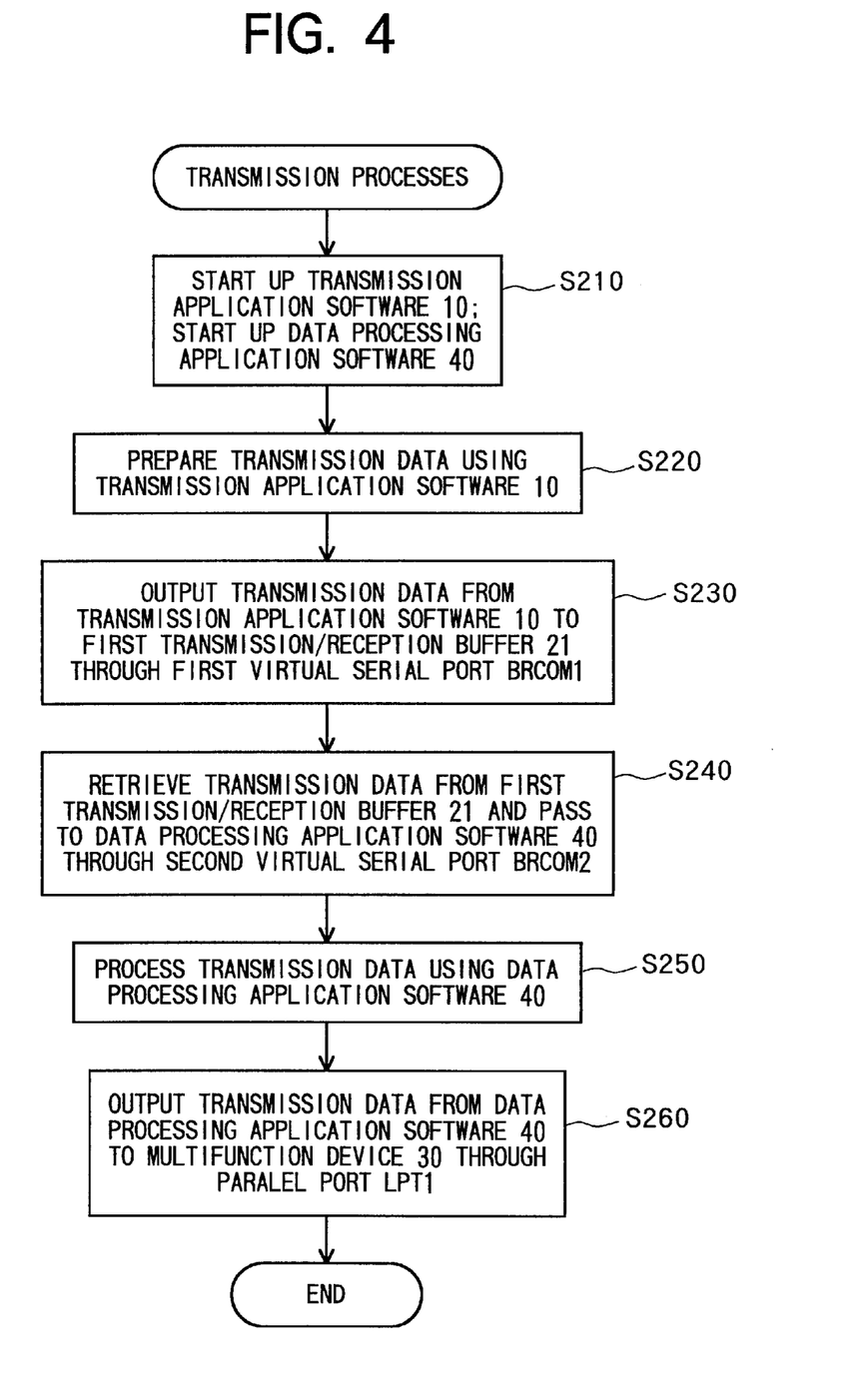
FIG. 4 is a flowchart representing transmission processes performed in the personal computer using the virtual transmission system.

Next, transmission processes performed by the CPU will be described while referring to FIG. 4. When transmission processes are started, in S210, the transmission application software 10 and the data processing application software 40 are started up. Then, in S220, transmission data is prepared using the transmission application software 10. In S230, the transmission data is outputted from the transmission application software 10 to the first transmission/reception buffer region 21 through the first virtual serial port BRCOM1. Next, in S240, transmission data is retrieved from the first transmission/reception buffer region 21 and passed to the data processing application software 40 through the second virtual serial port BRCOM2. At this point, in S250, the data processing application software 40 processes the transmission data by, for example, adding header information required for packet transmission. Finally, in S260, the transmission data is outputted from the data processing application software 40 to the multifunction device 30 through the parallel port LPT1.

Figure 5:
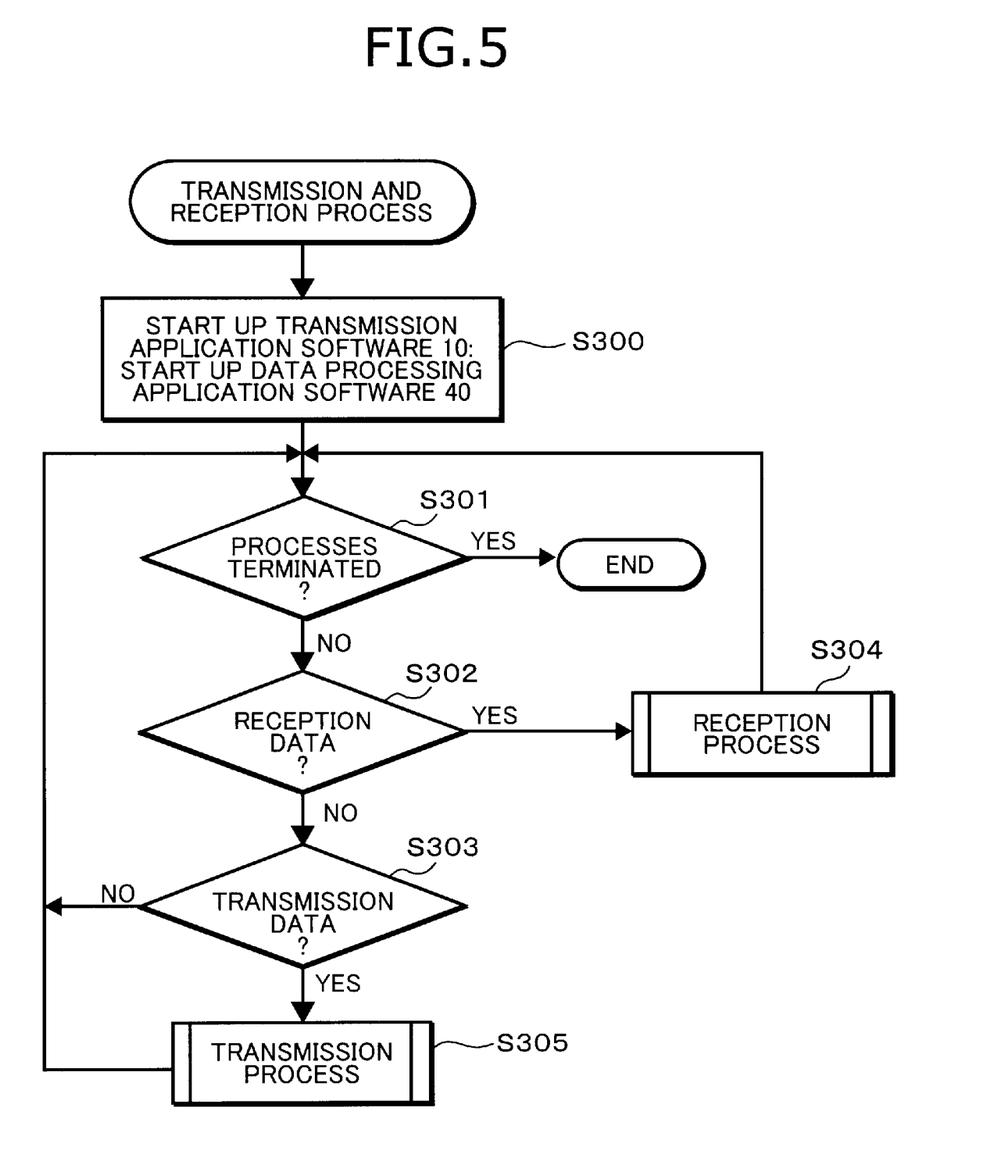
FIG. 5 is a flowchart representing a program for performing both transmission and reception processes in the personal computer using the virtual transmission system.
Figure 6:
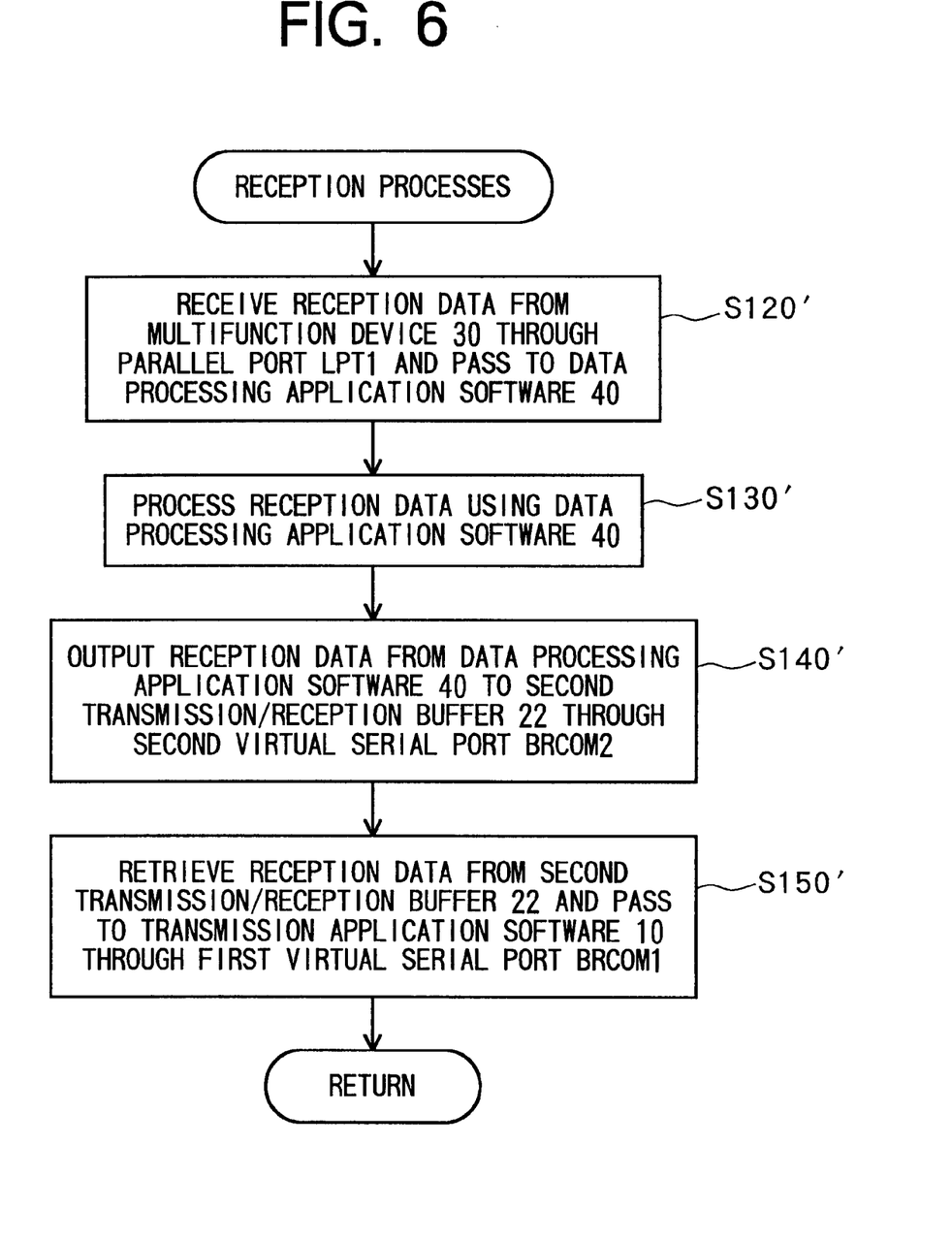
FIG. 6 is a flowchart representing reception process of the program of FIG. 5.

It should be noted that transmission and reception processes can be performed repeatedly as needed. This situation will be described briefly while referring to the flowcharts in FIGS. 5, 6, and 7. First, in S300, the transmission application software 10 and the data processing application software 40 are started up. Then, in S301 whether or not processes are terminated is determined. If so, then this program is ended. If not, then in S302 whether or not reception data has been received is determined, such as by determining whether the data processing application software 40 has received reception data from the multifunction device 30. If so, then reception processes are performed in S304. As shown in FIG. 6, the reception processes performed in S304 are substantially the same as the reception processes described with reference to FIG. 3. Afterward, the program returns to S301.

Figure 7:
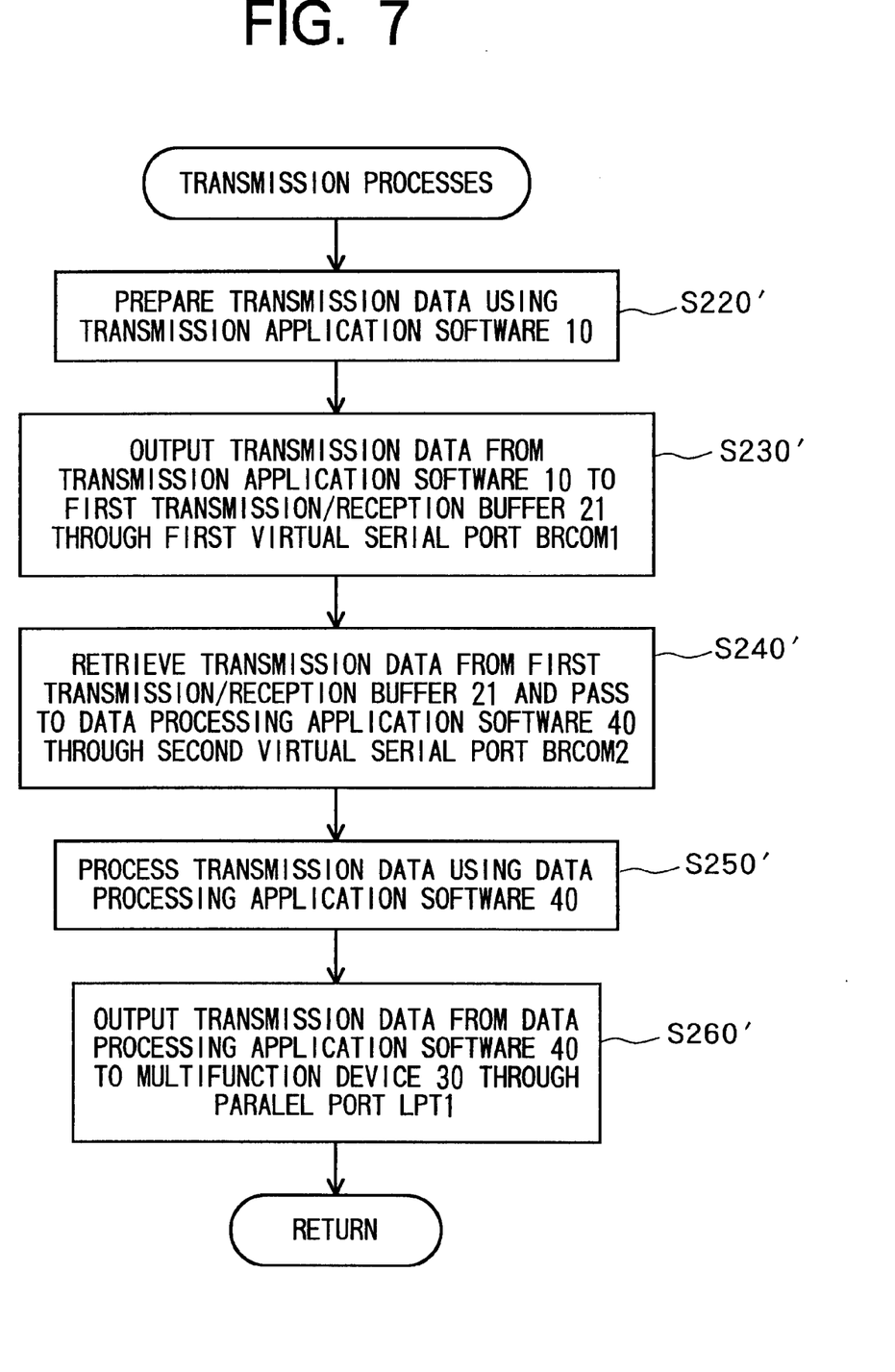
FIG. 7 is a flowchart representing transmission process of the program of FIG. 5.

If no reception data has been received (S302:NO), then whether or not transmission data is to be transmitted is determined, for example, by determining whether the data processing application software 40 has prepared data to be transmitted. If so, then transmission processes are performed in S305. As shown in FIG. 7, the transmission processes performed in S305 are substantially the same as the transmission processes described with reference to FIG. 4. Afterward, the program returns to S301. In this way, transmission and reception processes can be repeatedly performed as needed until processes are terminated in S301.

As described above, the present embodiment enables the commercially available transmission application software 10, which is configured for performing transmission with remote devices using a modem connected to a serial port, to perform transmission with a remote device using a fax modem function of the multi-function device 30, which is connected to the parallel port LPT1. In other words, although transmission application software 10 normally requires a serial port, the present embodiment enables the transmission application software 10 to perform transmission using a parallel port. This is accomplished by merely rewriting the serial.sys program in the device driver, which is a modifiable portion of the kernel mode. There is no need to change the transmission application software 10 itself. Also, because only a modifiable portion in the kernel mode is slightly changed, operation of the "Windows NT™" operating system will not be impaired.

The virtual serial ports BRCOM1, BRCOM2 and the buffer region regions 21, 22 are required for achieving the above-described functions. According to the present embodiment, programs for adding the virtual serial ports BRCOM1, BRCOM2 and the securing memory area for the buffer region regions 21, 22 are stored on a CD ROM, along with the data processing application software 40. Therefore, when the CD ROM is used to install the data processing application software 40 in the personal computer 1, the serial.sys program is also rewritten using the following processes.

Figure 2:
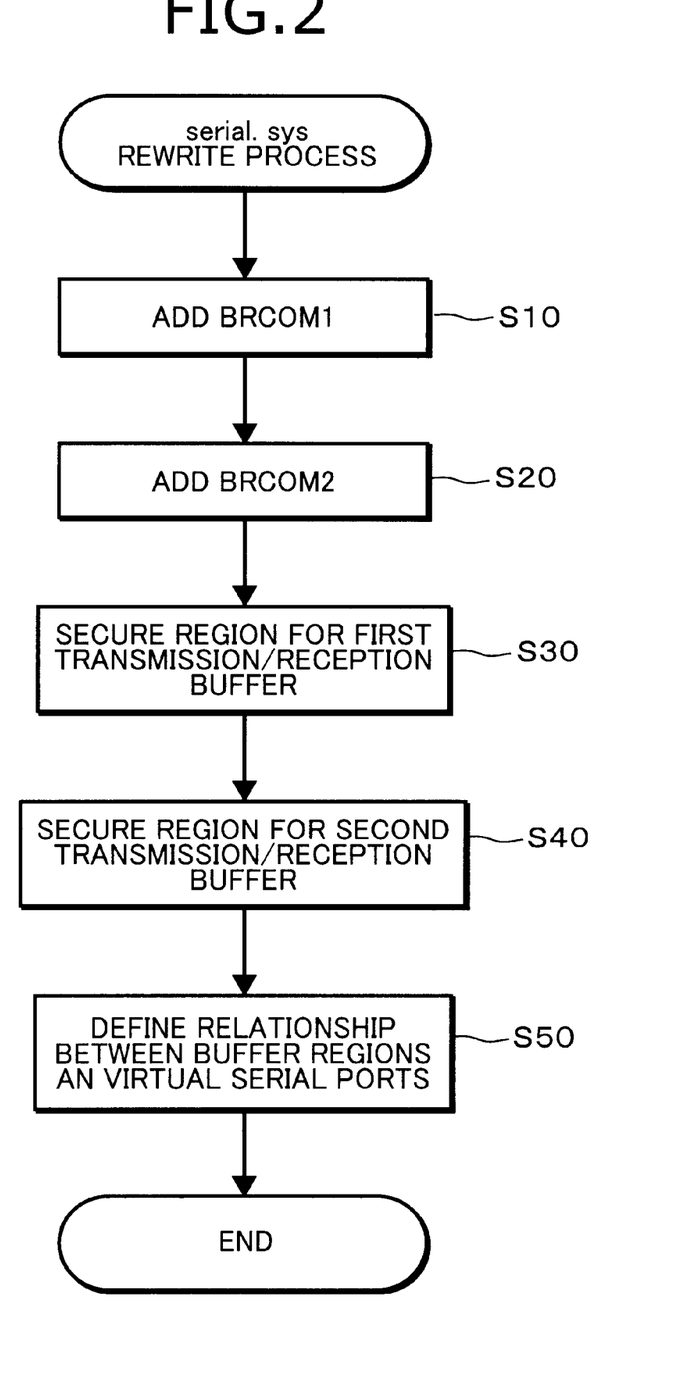
FIG. 2 is a flowchart representing processes for rewriting a kernel mode program of the personal computer to produce the system of FIG. 1.

First, the CD ROM storing the data processing application software 40 as a program is loaded into the personal computer 1 and operations for installing the program (i.e., the data processing application software 40) are executed. At this time, a program represented by the flowchart in FIG. 2 is executed as well to rewrite the serial.sys program. When this program is executed, commands are added to the serial.sys program. These commands are for controlling to add, that is, in addition to the serial ports COM1 to COM4 already provided to the personal computer 1, the first virtual serial port BRCOM1 in S10 and the second virtual serial port BRCOM2 in S20.

Then in S30 and S40, commands are added to the serial.sys program in order to secure memory area in the RAM 20 for the first transmission reception buffer region 21, which is for receiving data from the first virtual serial port BRCOM1 and passing the data to the second virtual serial port BRCOM2, and the second transmission reception buffer region 22, which is for receiving data from the second virtual serial port BRCOM2 and passing the data to the first virtual serial port BRCOM1.

Next in S50, commands are added to the serial.sys program in order to define relationships between the virtual serial ports BRCOM1, BRCOM2 and the first and second transmission reception buffer regions 21, 22. For example, these commands define which buffer is to be written with data from which port and to which port data from which buffer is to be sent. In particular, these commands define that data from the first virtual serial port BRCOM1 is to be written in the first transmission reception buffer region 21, that data stored in the first transmission reception buffer region 21 is to be sent to the second virtual serial portion BRCOM2, that data from the second virtual serial port BRCOM2 is to be written into the second transmission reception buffer region 21, and that data stored in the second transmission reception buffer region 22 is to be sent to the first virtual serial port BRCOM1.

In other words, the relationships between the virtual serial ports BRCOM1, BRCOM2 and the first and second transmission reception buffer regions 21, 22 are defined so that the first transmission reception buffer region 21 has the first virtual serial port BRCOM1 as its write port and the second virtual serial port BRCOM2 as its read out port and so that the second transmission reception buffer region 22 has the second virtual serial port BRCOM2 and its write port and the first virtual serial port BRCOM1 and its read out port. Here a brief explanation will be provided for the meaning of "write port" and "read out port" as used in the present specification. When a buffer is set with a port as its write port, data from the port is written in the buffer. When a buffer is set with a port as its read out port, data stored in the buffer is read out of the buffer and outputted to the port.

Although not shown in the drawings, an operation is also performed to add device drivers for the virtual serial ports BRCOM1, BRCOM2. This is required before the transmission application software 10 will recognize the existence of the ports. The serial.sys program has a section that indicates what ports are provided to the computer 1. Because this section is rewritten to show that the computer 1 has the virtual serial ports BRCOM1, BRCOM2, device drivers for these ports will be automatically added when the computer 1 is started up.

In this way, according to the present embodiment, because the above-described program for rewriting the serial.sys program and the program corresponding to the data processing application software 40 are stored on the same CD ROM, when the CD ROM that stores the data processing application software 40 in the form of a program is used to install application programs, then the program for rewriting the serial.sys program is also executed. When the program for rewriting the serial.sys program is executed, definitions are added to the serial.sys program, which is originally provided in the "Windows NT™" operating program. As a result of the added definitions, a virtual transmission system that uses the virtual serial ports BRCOM1, BRCOM2 and the first and second transmission reception buffer regions 21, 22 can be formed in the personal computer 1.

The virtual transmission system according to the present invention can be also used to check operations of the transmission application software 10. This example will be explained below. First, AT type commands used in communications between transmission application software and a device, such as a facsimile machine, connected to a serial port will be described. For example, the transmission application software transits an "AT" command to the facsimile machine and the facsimile machine responds with an "OK" signal. The transmission application software then sends an "ATD 123" command to the facsimile machine, commanding the facsimile machine to dial the number 123. After the facsimile machine dials the number 123, the facsimile machine sends another "OK" signal back to the transmission application software. Further, the transmission application software can request the facsimile machine to provide capabilities of the facsimile machine and receive responses, which are in the form of character trains.

Here, the check operations according to the present invention will be described. In this example, the application software 10 is still under development and so needs to have its operation checked for accuracy. The application software 10 is connected to the first virtual serial port BRCOM1 and a check program that is known to correctly respond to AT type commands is connected to the second virtual serial port BRCOM2. The check program can be one that displays received character trains and that outputs character trains according to keys pressed on a keyboard. When the application software 10 and the check program are connected in this manner, whether or not the application software 10 is correctly generating AT type commands can be easily determined. Also, whether the application software 10 changes AT type commands according to responses from a device connected to the check program can be easily checked. For example, when the application software 10 requests the connected device to advise its capabilities, and the connected device outputs its capabilities in response, whether or not the application software 10 is operating properly can be determined by checking whether the application software 10 outputs a start command for a mode listed in the capabilities received from the connected device.

The virtual transmission system of the present invention can be configured to process data outputted from the transmission application software 10 in some way. In the example given in the embodiment, the data is processed to produce packet data. This is because the multifunction device 30 receives data from other sources in addition to receiving data from the first virtual serial port BRCOM1 over the parallel port LPT1. For example, the multifunction device 30 receives print data and scanner data via the data processing application software 40 and prints out the print data. The multifunction device 30 is also provided with a scanner unit and so can use the scanner to retrieve image data based on a document. The multifunction device 30 can also output thus-retrieved image data to the application software 40 over the parallel port LPT1.

To prevent these three types of data from getting mixed together during packet transmission, headers are attached to the data. The headers include information for packet transmission, that is, packet number and data size. Each different type of data is allotted a different packet number. For example, print data is allotted the packet number 20, scanner data is allotted the packet number 30, and BRCOM1 data is allotted the packet number 40. Data is transmitted in the order of packet number, data size, and actual data. For example, when the multifunction device 30 receives two data packets of "40+2+AT" and "20+10+PRINTDATA!", the multifunction device 30 will be able to recognize that the two bytes of data in the first packet are BRCOM1 data and that the ten bytes of data in the next packet are print data.

The data processing application software 40 also receives data in the same packet form and so divides the received data into print data, scanner data, and BRCOM1 data and transmits the different data to corresponding programs. When the data processing application software 40 receives a command to output print data, scanner data, or BRCOM1 data, it adds a corresponding header to the data and transmits the resultant packets to the parallel port.

In addition to performing operation checks and data processing, the virtual transmission system of the present invention can be configured to merely store files, for example, in the hard disk of the computer 1. For example, information on what data was transmitted or received via the first and second virtual serial ports BRCOM1, BRCOM2 can be stored in the hard disk in a standard text format that readable by an editor. The data processing application 40 converts packet formatted data into an easily readable format before storing it in the hard disk. Here, are some examples of data stored in the hard disk by the data processing application 40 in an easily readable form:

W 40 00 02 AT

R 40 00 02 OK

W 20 00 10 PRINTDATA!

In these examples, the first byte of data indicates the direction in which the data is being transmitted, that is, "W" indicates that the data is being transmitted from the personal computer to the multifunction device and "R" indicates that the data is being transmitted from the multifunction device to the personal computer. As mentioned previously, the next two digits indicate the packet number, the following four digits indicate the data size, and the last sets of data are the actual data.

Further, the data processing application software 40 can be modified to enable its connection to one of the serial ports COM1–COM4 as well as to the parallel port LPT1, although when connected to one of the serial ports COM1–COM4, packet transmission would not be performed. With this configuration, by operating the data processing application software 40, connection can be switched between a serial port and a parallel port. For example, the data processing application software 40 can be modified to switch between serial and parallel ports in response to a remote control operation transmitted over the telephone network from an remote device. With this configuration, even if the transmission application software 10 is incapable of performing this switching operation based on a remote control operation, it can be connected to the serial port based on a remote control operation by operation of the data processing application software 40.

When the data processing application software 40 determines that a special command has come to the serial port, the data processing application software 40 can perform special operations. For example, when data reception is merely started, this can be displayed on a screen. In other words, whenever the transmission application 10 is not provided with a certain function, the data processing application software 40 can be modified to realize that certain function.

Although the embodiment described the data processing software 40 as retrieving data stored in the first transmission/reception buffer 21, any other application software of the computer 1 could be directed to retrieve data from the first transmission/reception buffer 21 by setting the application software with the second virtual serial port BRCOM2 as its write port.

While the invention has been described in detail with reference to specific embodiments thereof, it would be apparent to those skilled in the art that various changes and modifications may be made therein without departing from the spirit of the invention, the scope of which is defined by the attached claims.

For example, the above-described embodiment describes the case when the computer operating system is "Windows NT™", so describes rewriting the serial.sys program in the device driver to achieve the present invention. However, when the operating system is "Windows 95™", the serial driver can be directly rewritten. The present invention can also be applied to computers installed with other operating systems by rewriting the portion of the operating system that defines serial ports.

The data processing application software 40 need not be stored in a CD ROM but could be stored in any recording medium, such as a floppy disk or a hard disk. In systems that download programs over a transmission circuit, a server that stores programs to be downloaded could function as a memory medium according to the present invention.

What is claimed is:

1. A virtual transmission system comprising:
   first and second virtual serial ports provided virtually within a single data processing device, separately from physical parallel ports;
   a first transmission/reception buffer region set with the first virtual serial port as a write port and the second virtual serial port as a read out port;
   a second transmission/reception buffer region set with the first virtual serial port as a read out port and the second virtual serial port as a write port; and
   a control portion for writing data outputted from the first virtual serial port into the first transmission/reception buffer region, for outputting data written in the first transmission/reception buffer region to the second virtual serial port, for writing data outputted from the second virtual serial port into the second transmission/reception buffer region, and for outputting data written in the second virtual serial port to the first transmission/reception buffer region.

2. A virtual transmission system as claimed in claim 1, further comprising a memory storing:
   first transmission application software for performing transmission and reception using a serial port and set with one of the first and second virtual serial ports as the serial port, and
   second transmission application software for performing transmission and reception of data with the first transmission application software and set to output data to and input data from the other of the first and second virtual serial ports.

3. A virtual transmission system as claim in claim 1, further comprising a memory storing a kernel mode program for controlling operations of the control portion.

4. A virtual transmission system as claim in claim 2, wherein the second transmission application software is for processing data outputted during operation of the first transmission application software.

5. A virtual transmission system as claim in claim 4, further comprising a physical port for connecting with an external device, wherein the second transmission application software is for processing data from the first transmission application software and, based on the processed data, performing transmission and reception with the external device through the physical port.

6. A virtual transmission system as claim in claim 5, wherein the second transmission application software performs packet transmission with the external device.

7. A virtual transmission system as claim in claim 2, wherein the second transmission application software is adapted to perform reception and transmission with an external device through both an actual serial port and through an actual parallel port;
   and further comprising a switching unit for switching the second application software between performing reception and transmission through the actual serial port and through the actual parallel port.

8. A virtual transmission system as claim in claim 5, wherein the external device is a facsimile machine and the second application software performs at least one of addition and deletion of header information that indicates that data outputted from the first transmission application software is facsimile data.

9. A virtual transmission system as claim in claim 2, wherein the first transmission application software is software under development and the second application software is for performing transmission and reception with the first transmission application software to check operation of the first transmission application software.

10. A virtual transmission system as claim in claim 2, wherein second application software is for storing data outputted from the first transmission application software into files.

11. A method of performing transmission and reception of data comprising the steps of:
    providing first and second virtual parallel ports, which are different from physical serial ports;
    outputting transmission data from a first transmission application software through a first virtual serial port;
    storing the transmission data in the first transmission transmission/reception buffer region; and
    retrieving the transmission data from the first transmission/reception buffer region and passing the transmission data through the second virtual serial port to a second application software.

12. A method as claimed in claim 11 further comprising the steps of:
    outputting reception data from the second application software over the second virtual serial port;
    storing the reception data in the second transmission/reception buffer region; and
    retrieving the reception data from the second transmission/reception buffer region and passing the reception data through the first virtual serial port to the first transmission application software.

13. A method as claimed in claim 11 further comprising a step of outputting transmission data from the second application software through an physical port to an external device.

14. A method as claimed in claim 13 further comprising the steps of:

receiving reception data from the external device through the physical port and passing the reception data to the second application software;

outputting the reception data from the second application software through the second virtual serial port;

storing the reception data in the second transmission/reception buffer region; and retrieving the reception data from the second transmission/reception buffer region through the first virtual serial port and passing the reception data to the first transmission software application.

15. A memory medium storing:

a program for adding first and second virtual serial ports, which are different from physical parallel ports, within a single computer;

a program for securing, within the single computer, a first transmission/reception buffer region that receives data from the first virtual serial port and passes the data to the second virtual serial port; and a program for securing, within the single computer, a second transmission/reception buffer region that receives data from the second virtual serial port and passes the data to the first virtual serial port.

16. A memory medium as claims in claim 15, further comprising:

a program for setting relationship between the first virtual serial port, the second virtual serial port, the first transmission/reception buffer region, and the second transmission/reception buffer region; and a program for performing virtual transmission using the first virtual serial port, the second virtual serial port, the first transmission/reception buffer region, and the second transmission/reception buffer region.

17. The virtual transmission system as claimed in claim 1, wherein the first and second virtual serial ports are for transmission and reception exclusively within the single data processing device.

18. The method as claimed in claim 11, wherein the first and second virtual serial ports are for transmission and reception exclusively within a single data processing device.

19. The memory medium as claimed in claim 15, wherein the first and second virtual serial ports are for transmission and reception exclusively within a single data processing device.

20. A transmission system comprising:

a data transmission device capable of transmission with a remote transmission device; and a data processing device connected to the data transmission device, including:

a physical port connected physically with the data transmission device;

first and second virtual serial ports provided virtually within the data processing device, separately from physical serial ports;

a first transmission/reception buffer region set with the first virtual serial port as a write port and the second virtual serial port as a read out port;

a second transmission/reception buffer region set with the first virtual serial port as a read out port and the second virtual serial port as a write port;

a control portion for writing data outputted from the first virtual serial port into the first transmission/reception buffer region, for outputting data written in the first transmission/reception buffer region to the second virtual serial port, for writing data outputted from the second virtual serial port into the second transmission/reception buffer region, and for outputting data written in the second virtual serial port to the first transmission/reception buffer region; and a transmission application software that performs transmission and reception with the second virtual serial port, and that performs transmission and reception with the data transmission device over the physical port.

21. The transmission system as claimed in claim 20, wherein the physical port connected physically with the data transmission device is a parallel port.

22. The transmission system as claimed in claim 20, wherein the first and second virtual serial ports are for transmission and reception exclusively within the data processing device.

* * * * *